United States Patent
Iida et al.

(10) Patent No.: US 6,655,026 B1
(45) Date of Patent: Dec. 2, 2003

(54) PRODUCTION PROCESS FOR CONNECTING ROD FOR INTERNAL COMBUSTION ENGINE

(75) Inventors: Zenji Iida, Wako (JP); Mitsuo Takashima, Wako (JP); Shigeki Muroga, Wako (JP); Seiichi Koike, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/490,149

(22) Filed: Jan. 24, 2000

(30) Foreign Application Priority Data

Jan. 28, 1999 (JP) .......................................... 11-020580

(51) Int. Cl.$^7$ .............................................. B23P 17/00
(52) U.S. Cl. ........................ 29/888.09; 29/557; 72/340; 148/211; 451/38
(58) Field of Search .............................. 29/888.09, 557; 72/340; 451/38, 53; 148/211, 212, 219, 226, 906

(56) References Cited

U.S. PATENT DOCUMENTS

| | | | |
|---|---|---|---|
| 3,964,737 A | * | 6/1976 | Schober |
| 4,191,599 A | * | 3/1980 | Stickels et al. |
| 5,152,851 A | * | 10/1992 | Yamamoto et al. |
| 5,556,348 A | * | 9/1996 | Kokubu et al. |
| 5,592,840 A | * | 1/1997 | Miyasaka |
| 5,735,769 A | * | 4/1998 | Takemura et al. |
| 6,099,391 A | * | 8/2000 | Suzuki et al. ................. 451/53 |

FOREIGN PATENT DOCUMENTS

| | | | |
|---|---|---|---|
| JP | 62-203766 | | 9/1987 |
| JP | 2-120506 | | 5/1990 |
| JP | 03-002319 | * | 1/1991 |
| JP | 04-159081 | * | 6/1992 |
| JP | 04-337048 | * | 11/1992 |
| JP | 5-70828 | | 3/1993 |
| JP | 05-195070 | * | 8/1993 |
| JP | 6-71520 | | 3/1994 |
| JP | 9-14252 | | 1/1997 |
| JP | 09-176792 | * | 7/1997 |
| JP | 9-196044 | | 7/1997 |
| JP | 11-10541 | | 1/1999 |

OTHER PUBLICATIONS

"Carburizing" Treat All Metals, Inc. Web site [http://www.treatallmetals.com/gas.htm].*
Handbook for Metallurgy, Fourth Edition, published 1982; Editor the corporation aggregate Japan Inst. of Metals; Publisher Kumao Ebihara; p. 789, with an English translation.

* cited by examiner

*Primary Examiner*—Gregory Vidovich
*Assistant Examiner*—Eric Compton
(74) *Attorney, Agent, or Firm*—Arent Fox Kintner Plotkin & Kahn, PLLC

(57) ABSTRACT

Material for a connecting rod for an internal combustion engine is carburized and quenched, a carburized layer formed on the bearing portion is ground until the portion which exhibits the maximum compressive residual stress, and a shot-peening processing is performed on the ground surface. The invention produces a bearing portion having surface characteristics in which maximum compressive residual stress is imparted, and therefore, remarkable improvement in the fatigue strength in the bearing portion can be obtained. Furthermore, a large number of concavities formed by the shot-peening processing can be efficiently employed as an oil reservoir, so that sliding properties and lubrication can be improved, and the occurrence of problems such as fretting corrosion, galling, and seize can also be solved, and the galling and problems of the seize can be prevented.

14 Claims, 5 Drawing Sheets

A: As Carburized and Quenched
B: Grinding→Shot Peening (Invention)
C: Only Shot Peening (Prior Art)

PRODUCTION PROCESS FOR CONNECTING ROD FOR INTERNAL COMBUSTION ENGINE

BACKGROUND OF THE INVENTION

The present invention relates to a production process for a connecting rod for internal combustion engines, and specifically relates to a strengthening method for inner surfaces of a bearing into which a piston pin and a crankpin fit in sliding and relative rotating connection.

Generally, a connecting rod such as the above comprises a small end formed at an end of a rod-like portion as a main element and a big end formed at the other end of the rod-like portion. A piston pin of a piston is fitted into the small end and a crankpin of a crankshaft is fitted into the big end in sliding and relative rotating connection. The connecting rod converts the reciprocation of the piston to the rotation of the crankshaft. Such a connecting rod repeatedly receives inertial force from the piston and explosive pressure in the combustion chamber, so that fluctuation of the load, such as tension and compression, repeatedly affects each end of the rod (hereinafter collectively referred to as the "bearing portion"). Generally, a bearing metal is fixed in the inner surface of the bearing in order to reduce sliding resistance and noise. In this case, there is a concern that relative sliding between the inner surface of the bearing portion and the bearing metal will occur by the fluctuating load which impinges on the bearing portion, and that fretting corrosion will occur. The fretting corrosion causes remarkable decrease of fatigue strength. Therefore, the thickness of the bearing portion must be additionally designed in consideration of the decrease in the fatigue strength, so that a design to reduce the weight of the apparatus is difficult. A structure in which the bearing metal is omitted for the sake of a light-weight design is known. In this structure, the piston pin and the crankpin are directly supported by the inner surface of the bearing portion, and a lubricating oil is supplied through oil paths, which are formed in the connecting rod, to the sliding surface. In this structure, the sliding portion tends to be galling and seize, and there was a problem that it was difficult to ensure sufficient fatigue strength.

Carburizing and quenching processing has been employed to ensure or improve fatigue strength. The carburizing and quenching processing is a heat processing method in which a product formed of steel with a relatively low carbon content is heated in a carburizing gas comprising CO gas and $CH_4$ gas, etc, as a main component so as to disperse and permeate carbon into the surface layer of the product, and then the product is quenched so as to harden only the surface layer. However, oxygen-containing components such as $H_2O$, $CO_2$, and CO are also included in the carburizing gas, so that oxygen permeates into the surface layer during carburization. The oxygen combines with elements such as Cr, Mo, Si, etc., which are originally added for improving quenching properties, and oxides precipitate at the grain boundaries in the steel. As a result, a grain boundary oxidized layer, which is relatively soft, is formed to a depth of about 50 to 10 $\mu$m, and the quenching properties of the surface layer after the carburization is deteriorated, and desired fatigue strength cannot be obtained.

Japanese Patent Application Laid Open (Kokai) No. 62-203766 discloses a process for improving fatigue strength by the carburizing and quenching processing. According to the process, the grain boundary oxidized layer (referred to as the "abnormal carburized layer" in the publication) is removed by chemical dissolution after the carburizing and quenching processing, and then shot-peening is performed on the treated surface. Japanese Patent Application Laid Open No. 6-71520 discloses a process in which the grain boundary oxidized layer is removed by CBN (cubic boron nitride) grinding, and then shot-peening is performed on the ground surface. In both processes, the grain boundary oxidized layer must be removed, and the portion in which the compressive residual stress has been formed by the quenching is exposed on the surface, and then the shot-peening is performed thereon, so that new compressive residual stress is imparted.

The quenching depth according to the carburizing and quenching processing, that is, the depth to which the compressive residual stress is formed, varies according to the condition of the carburizing and quenching processing (temperature, carbon concentration, processing time, etc.). It will be the best for the surface hardening processing if the hardest portion, in which the compressive residual stress exhibits the maximum value, can be exposed as a surface. However, in the conventional processes, the processing of fresh surface, from which the grain boundary oxidized layer is removed or the surface on which the shot-peening was performed, is not always the portion which exhibits the highest compressive residual stress. According to the research of the inventors, the depth to which the compressive residual stress exhibits the maximum value is approximately 100 to 200 $\mu$m, and is deeper than the usual grain boundary oxidized layer (approximately a depth of 10 to 50 $\mu$m, as mentioned above). Therefore, it has not been possible for the surface to exhibit the maximum value of the compressive residual stress even if the grain boundary oxidized layer is removed and shot-peening is performed thereon.

SUMMARY OF THE INVENTION

It is therefore an object of the invention to provide a production process for a connecting rod for internal combustion engines, in which the fatigue strength is remarkably improved by an optimum surface hardening processing and the problem of the sliding properties, such as galling and seize, can also be solved.

The present invention provides a production process for a connecting rod for internal combustion engines, the process comprising a carburizing and quenching processing for forming a carburized layer in a surface layer of a material of a connecting rod for internal combustion engines, a grinding processing for grinding the carburized layer formed in a bearing portion of the material until the depth at which compressive residual stress exhibits the maximum value, and a shot-peening processing of the surface ground by the grinding processing.

In the invention, first the carburizing and quenching processing is performed on the material of the connecting rod which is formed of steel with low carbon content. By the carburizing and quenching processing, a carburized layer, which is provided with compressive residual stress and is hardened, is formed at the surface layer of the material. Carburizing and quenching processing in the invention refers to a series of processes in which the material is retained in the carburizing gas at 900° C. or more, for example, and then the material is rapidly cooled and tempered. A grain boundary oxidized layer exists in the outermost surface of the formed carburized layer. FIG. 1 shows the characteristics of the surface layer after the carburizing and quenching processing is performed on low-carbon steel, the hardness, the proportion of retained austenite, and the compressive residual stress. These characteristics are approximately as shown in FIG. 1, even though some differences will be observed according to differences in processing conditions. In FIG. 1, the portion indicated by the oblique lines on the left shows the grain boundary oxidized layer. According to FIG. 1, the hardness is constant over some interval from the surface, and it becomes lower below a certain depth. The proportion of the retained austenite is high in the vicinity of the surface, and decreases as the depth increases. The compressive residual stress is small in the vicinity of the surface, increases as the depth increases, and then decreases after it exhibits the maximum value at a certain depth. After the carburizing and quenching processing in which such characteristics are exhibited, the grinding processing for grinding the carburized layer formed in the bearing portion of the material until the depth at which compressive residual stress is at the maximum value is performed. That is, the portion in which the compressive residual stress is the maximum is exposed on the surface of the bearing portion. In the subsequent shot-peening processing, shot-peening is performed on the ground surface of the bearing portion. By the shot-peening processing, new compressive residual stress is provided and a large number of fine concavities is formed on the surface of the bearing.

According to the invention, by grinding the carburized layer of the bearing portion and exposing the portion in which the compressive residual stress exhibits the maximum value as a surface, and by performing shot-peening on the surface, the largest compressive residual stress which can be regarded as being obtainable can be imparted to the bearing portion. Therefore, remarkable improvement in fatigue strength can be obtained. Furthermore, the large number of concavities formed by the shot-peening processing can efficiently employed as an oil reservoir. As a result, sliding properties and lubrication can be improved, and the occurrence of problems such as fretting corrosion, galling, and seize can also be solved, and the galling and problems of seize can be prevented. It should be noted that the bearing portion I the invention refers to at least one of a small end and a large end of a connecting rod, and to an inner surface of a bearing bore which fits with the shaft elements such as a piston pin or a crankpin in sliding and relative rotating connections.

Conventional means for the shot-peening processing, in which shot (particles) strike the surface using hydrostatic pressure, such as that of air or water, and the surface is mechanically impacted (peening), can be applied in the invention. Materials for the shot may be chosen from glass and steel, and materials are specifically chosen to obtain the optimum peening effect. It is desirable that a large number of arcuate concavities be formed on the shot-peened surface for the oil reservoir for the lubricating oil. Therefore, the shape of the shot is desirably spherical and size of the shot is chosen from a range in which a large number of fine concavities can be formed. In the invention, the shot-peening processing is performed to the ground surface of the bearing portion, but may also be performed over the entire surface of the connecting rod. Portions other than the bearing portion are not ground. That portion is treated with carburizing and quenching, and a grain boundary oxidized layer exists thereon. Therefore, the surface is provided with compressive residual stress and hardness. When the shot-peening processing is performed over the entire surface, the bearing portion is simultaneously shot-peened. In this case, the process for avoiding impacts on the portion other than the bearing portion is omitted, and there is an advantage in that productivity is improved.

The effect of the shot-peening processing, in which a large number of fine concavities are used for an oil reservoir with improvement in fatigue strength according to the obtaining of the compressive residual stress, has already been mentioned. According to the research by the inventors, it was discovered that the depth of the carburized layer remaining after grinding processing affects the compressive residual stress and the surface roughness after the shot-peening processing. It should be noted that the "depth" refers to the depth, from the surface which appears after the grinding processing and exhibits the maximum compressive residual stress, to the deepest portion of the carburized layer. The inventors have found that the compressive residual stress after shot-peening processing is ensured at high levels, and concavities having uniform shapes are formed thereby, making the roughness uniform to a fine degree, when the depth of the remaining carburized layer is 0.15 mm or more. Therefore, according to a preferred aspect of the invention, the grinding processing of the carburized layer after the carburizing and quenching processing may be performed so that the carburized layer remains at 0.15 mm or more. The surface roughness obtained by the shot-peening processing is made uniform so that lubricating oil is uniformly supplied over the entire bearing portion, and the sliding properties are improved.

Furthermore, the inventors also discovered through research that the shot-peening pressure in the shot-peening processing affected the surface roughness, which was uniform when the shot-peening pressure was 60 MPa or more, preferably in the range of 100 to 150 MPa. Therefore, according to a preferred aspect of the invention, the shot-peening pressure in the shot-peening processing after the grinding processing is 60 MPa or more. By performing the shot-peening processing at the shot-peening pressure on the ground surface of the bearing portion, the surface roughness is made uniform. Therefore, the lubricating oil is uniformly supplied over the entire bearing portion, and the sliding properties are remarkably improved. In the case in which the shot-peening processing is performed, not only on the bearing portion, but also on the entire connecting rod, as mentioned above, the grain boundary oxidized layer can be certainly removed when the above shot-peening pressure is applied. It should be noted that the "shot-peening pressure" refers to the pressure in the fluid used to strike the shot on the object plane; it is air pressure when the fluid is air, and it is water pressure when the fluid is water.

DETAILED DESCRIPTION OF THE INVENTION

Figure 1:
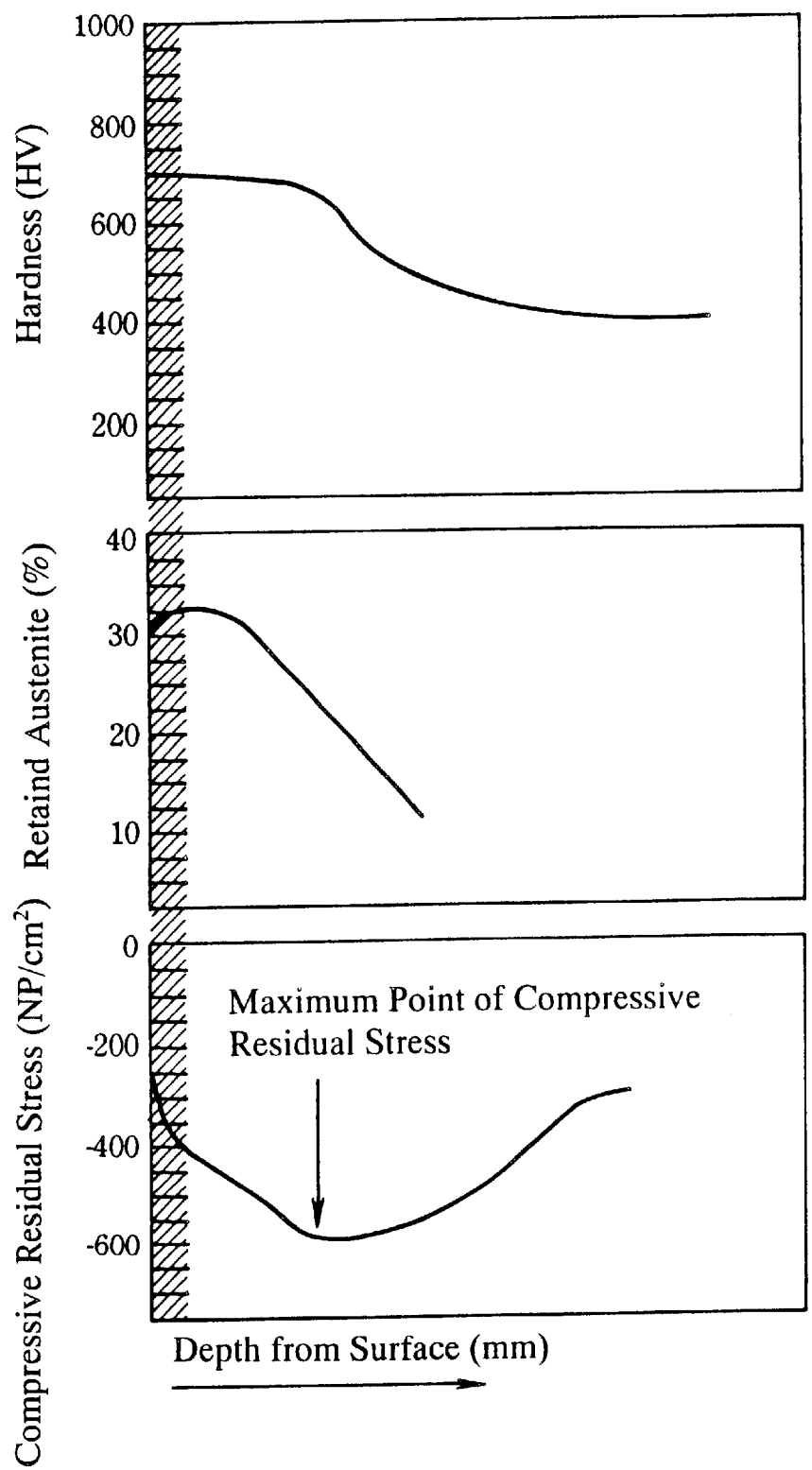
FIG. 1 is a chart showing the characteristics of the surface portion after carburizing and quenching processing in a low-carbon steel.

An embodiment of the invention will be explained hereinafter.

(1) Carburizing and Quenching Processing

A material for connecting rods formed of a low-carbon steel containing carbon in the range of 0.1 to 0.25 weight % and Cr, Mo, and Si, etc., for improving quenching properties, is prepared. The material is heated to about 1300K (1000° C.) in a carburizing gas containing CO gas and $CH_4$ gas as a main component, and is then quenched. The carbon diffuses and permeates by the carburizing from the material surface to a depth of about 1 mm. The carburized layer is hardened by being provided with the compressive residual stress by the quenching. In the outermost surface of the material, a grain boundary oxidized layer which is comparatively soft is formed by the carburizing. The carburizing processing is performed under conditions in which the carburized layer including the grain boundary oxidized layer remains at a depth of 0.15 mm or more after it was ground to the portion which exhibits the maximum value of the compressive residual stress in the next grinding processing. For example, the depth of the carburized layer is about 500 μm in this case.

(2) Grinding Processing

The carburized layer in the inner surface of the bearing portion (small end and large end) of the grinding processing process material is ground to a depth which exhibits the maximum value of the compressive residual stress imparted to the carburized layer. A conventional grindstone grinding in which a grinding wheel is rotated at high speed to grind a processing surface can be employed. Specifically, a cylindrical internal grinding method can be employed since the inner surface of the bearing portion is ground. Grinding methods in which tension residual stress is given is not suitable. By the grinding processing, a portion which exhibits maximum compressive residual stress is exposed as an inner surface of the bearing portion. It should be noted that the depth which exhibits the maximum value of the compressive residual stress should be accounted for beforehand according to the condition of the carburizing processing, and the grinding depth should be properly determined according to the data in the grinding processing.

(3) Shot-peening Processing

Shot-peening processing is performed over the entire surface of the material including the inner surface of the bearing portion on which the grinding processing has been performed using a high pressure water jet. The shot used in the processing is spherical glass beads with a diameter of about 0.04 mm, and the water pressure is 60 MPa or more, and preferably in the range of 100 to 150 MPa. By the shot-peening processing, compressive residual stress is further imparted to the inner surface of the bearing portion, and a large number of concavities is formed at the impacts of the shot as an effective oil reservoir. The grain boundary oxidized layer is removed from the portion which was not ground except for the inner surface of the bearing portion. The shot-peening is also effective to the exposed surface by removing the grain boundary oxidized layer, so that hardness and compressive residual stress are imparted.

Figure 2:
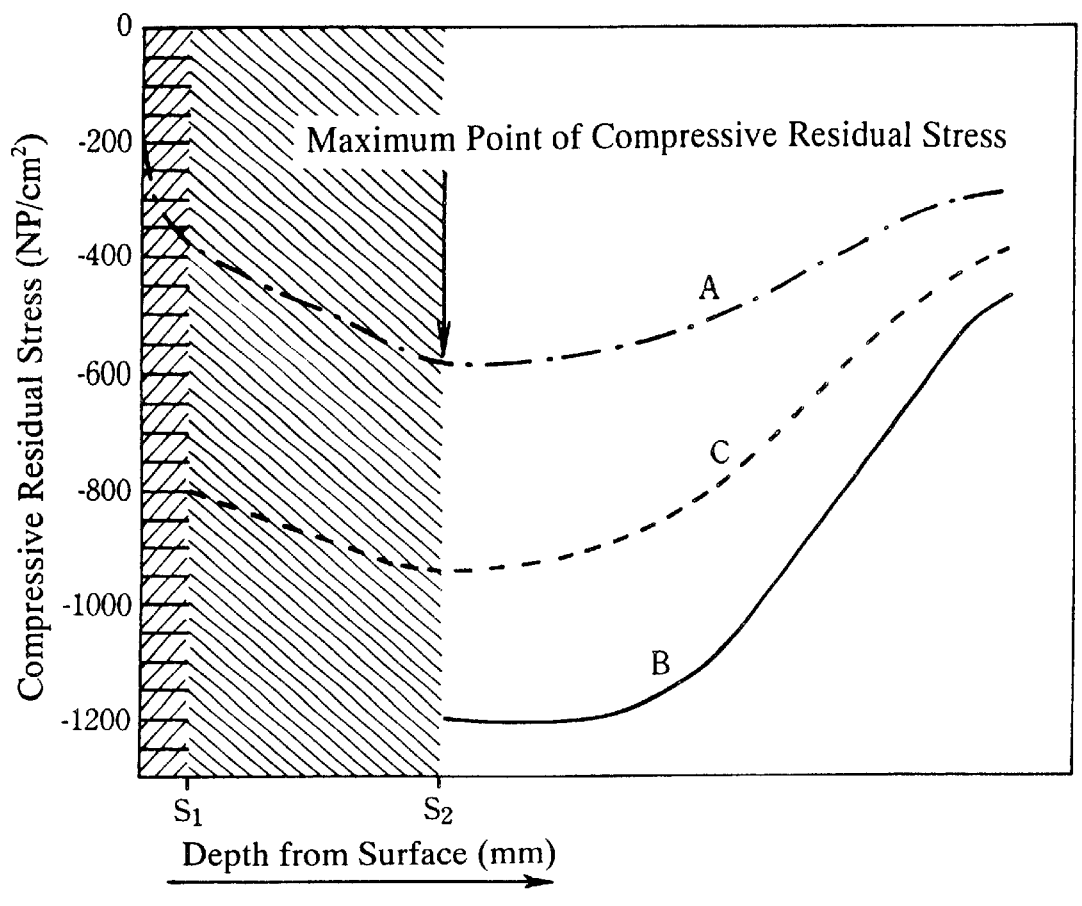
FIG. 2 is a chart showing the relationship between compressive residual stresses and depths of a surface layer of a material, specifically showing the change of the relationship according to the difference of the processing.

Thus, a connecting rod according to the invention can be obtained. FIG. 2 shows the compressive residual stress which varies according to the processing in the material. The line A in the figure shows the compressive residual stress according to the depth after the carburizing and quenching processing. The depth of the carburized layer is about 500 μm, and a grain boundary oxidized layer with a depth of $S_1$ is formed on the outermost surface. In the invention, the grinding processing is performed from this condition to the depth indicated by $S_2$ in which the compressive residual stress formed by the carburizing and quenching processing exhibits the maximum value. The maximum value of the compressive residual stress is about $-600$ $NP/cm^2$ in the illustrated example. Then, the shot-peening processing is performed on the ground surface, so that the compressive residual stress is further increased to the line B, (the value decreases downward in the figure), the obtained surface exhibits a value of about $-1200$ $NP/cm^2$. It should be noted that the line C shows the compressive residual stress in the case in which the grinding processing is performed on the grain boundary oxidized layer after the carburizing and quenching processing, and the shot-peening processing is performed on the ground surface. Thus, the conventional method can at most obtain the compressive residual stress indicated by the line C.

EXAMPLES

Next, the advantages of the invention will be clearly seen by examples.

A. Depth of Remaining Carburized Layer after Grinding Processing

Figure 3A:
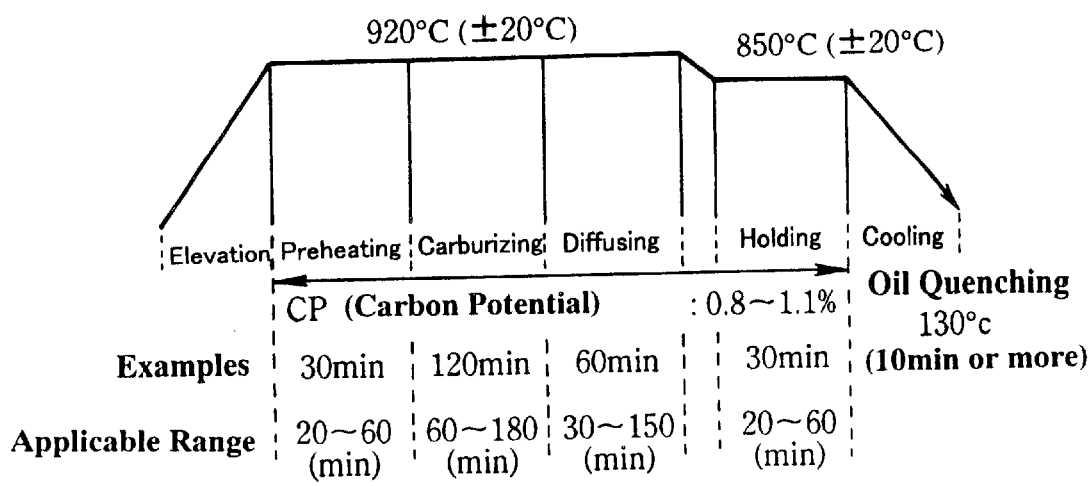
FIG. 3A is a time chart showing the condition of the carburizing and quenching processing in the examples.
Figure 3B:
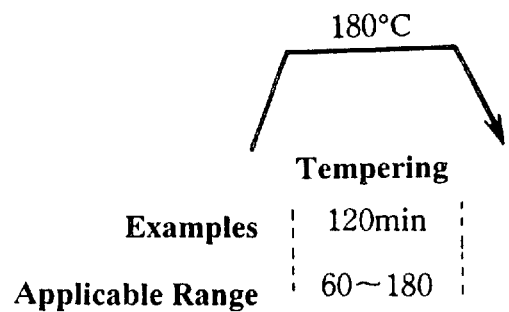
FIG. 3B is a time chart showing the condition of the tempering in the examples.
Figure 4:
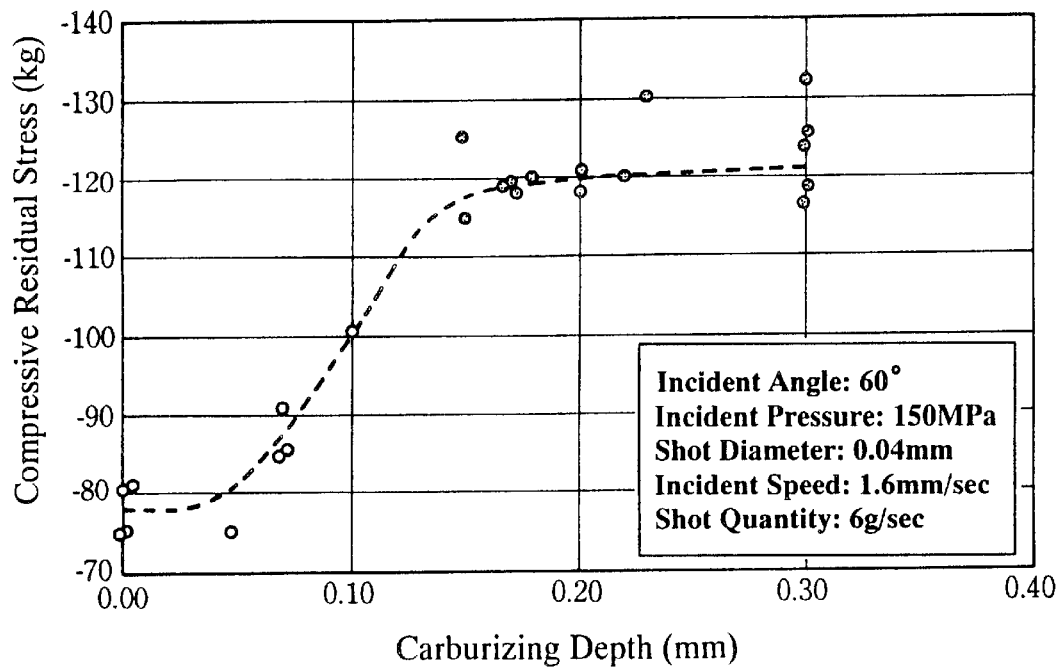
FIG. 4 is a chart showing the relationship between the depth of the remained carburized layer after the grinding processing and the compressive residual stress after the shot-peening processing.

A-1. Relationship Between Depth of Remaining Carburized Layer after Grinding Processing and Compressive Residual Stress after Shot-peening Processing A plurality of samples in which a carburized layer, remained to a depth of 0 to 0.30 mm were obtained by a grinding processing after performing a carburizing and quenching processing in the condition shown in FIG. 3. The compressive residual stresses of the surfaces were measured after the shot-peening processing using a high pressure water jet was performed on the surfaces of the samples. The processing time of each process is shown in FIG. 3 together with the ranges which can be applied to the invention. The processing time differs according to the size of the sample, and the processing time is long when the sample size is large. The conditions of the shot-peening processing were as follows: angle of incidence to the processing surface, 60°; incident pressure (water pressure), 150 MPa; shot diameter of glass bead, 0.04 mm; incident speed, 1.6 mm/sec; quantity of shot, 6 g/sec. The results are shown in FIG. 4. As apparent from FIG. 4, the compressive residual stress increases from 0.00 mm (the case in which all of the carburized layer was removed) to about a depth of 0.15 mm in the remaining carburized layer after grinding procession, and is almost constant over a depth of 0.15 mm. Therefore, the largest compressive residual stress can be ensure when the remaining depth of carburized layer after the grinding processing is at least 0.15 mm.

Figure 5:
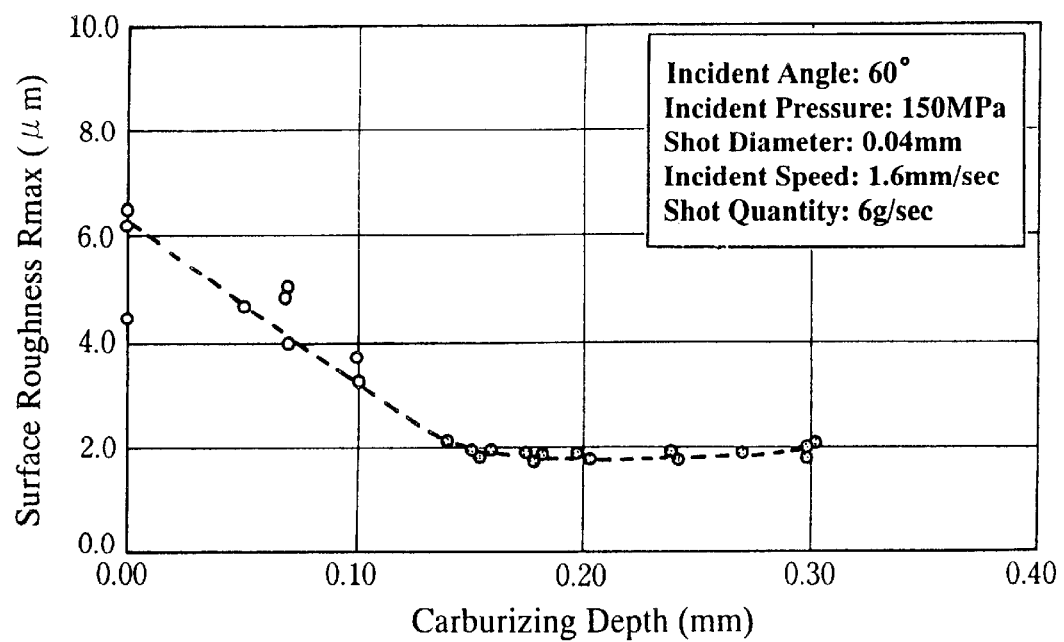
FIG. 5 is a chart showing the relationship between the depth of the remaining carburized layer after the grinding processing and the surface roughness after the shot-peening processing.

A-2. Relationship Between Depth of Remaining Carburized Layer after Grinding Processing and Surface Roughness after Shot-peening Processing A plurality of samples in which a carburized layer remained at a depth of 0 to 0.30 mm was obtained by a grinding processing after performing a carburizing and quenching processing in the same conditions as above. The surface roughness was measured after the shot-peening processing using a high-pressure water jet was performed on the surfaces of the samples. The conditions of the shot-peening processing were the same as the test A-2. The results are shown by a diagram in FIG. 5. As is apparent from FIG. 5, the surface roughness decreases, that is, the surface becomes finer, from 0.00 mm (the case in which all the carburized layer was removed) to about a depth of 0.15 mm of the remaining carburized layer after grinding processing, and is almost constant in the minimum value over a depth of 0.15 mm. Therefore, the surface roughness can be fine and uniform when the carburized layer after the grinding processing remains at a depth least 0.15 mm.

B. Relationship Between Shot-peening Pressure and Surface Roughness

Figure 6:
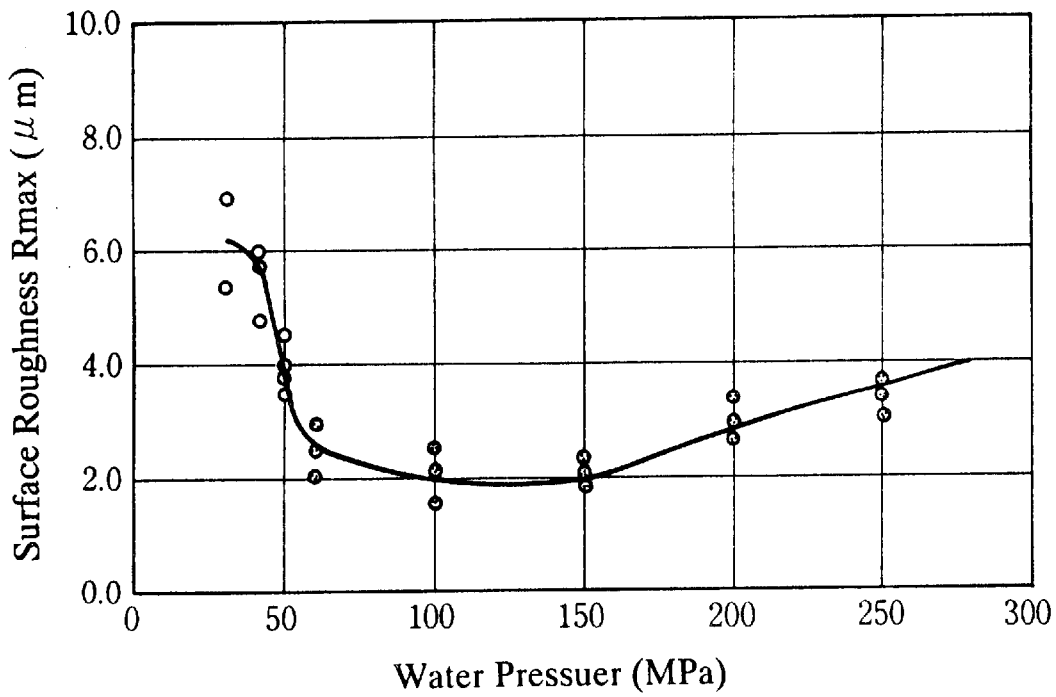
FIG. 6 is a chart showing the relationship between the shot-peening pressure and the surface roughness.

After performing a carburizing and quenching processing in the same conditions as above and a grinding processing, a plurality of samples were obtained by a shot-peening processing using a high-pressure water jet in which the water pressure was varied from 30 to 250 MPa at the surface. The conditions of the shot-peening processing were the same as in the test A-1 except for the water pressure. FIG. 6 shows the results in a diagram. As is apparent from FIG. 6, the surface roughness substantially decreases, that is, the surface becomes much finer, from 30 to about 60 MPa, and is almost constant in the minimum value, and then tends to slowly become coarser over 150 MPa. Therefore, the surface roughness can be fine and uniform when the water pressure in the shot-peening processing, that is, the shot-peening pressure, is set at 60 MPa or more, preferably in the range of 100 to 150 MPa.

C. Effects of Shot-peening Processing on Non-Ground Surface

Figure 7:
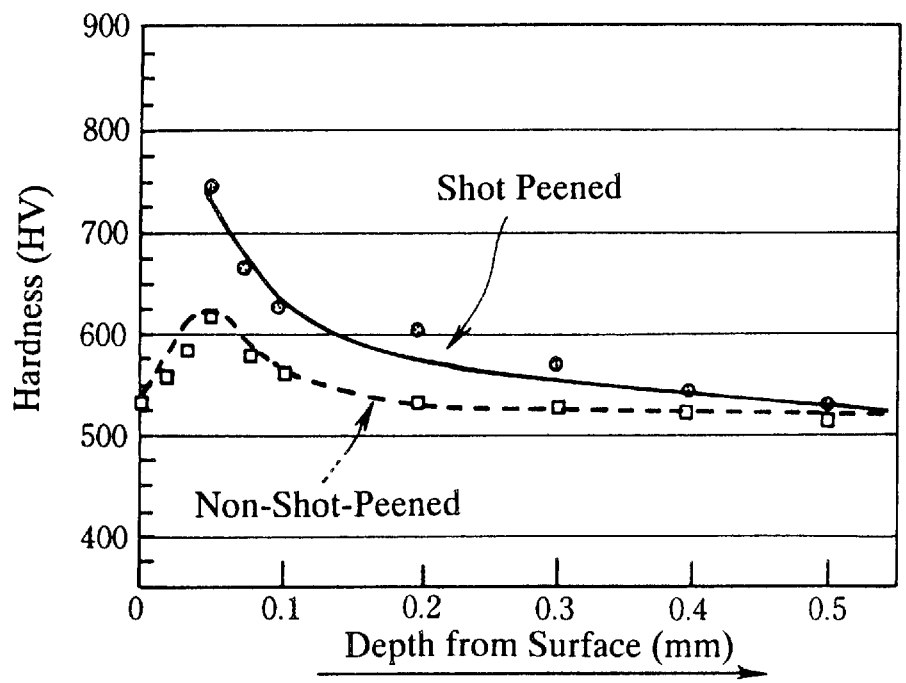
FIG. 7 is a chart for explaining the effect of the shot-peening processing in the non-ground surface.

In the case in which the shot-peening processing was performed and in the case in which the shot-peening was performed, the hardness of the non-ground surface except for the ground bearing portion was measured according to the depth from the surface. The conditions of the shot-peening were same as in the test A-1. FIG. 7 shows the results in a diagram. When the shot-peening processing was performed, grain boundary oxidized layer $S_1$ of the surface was removed by the shot-peening processing. According to the figure, it can be seen that harder materials can be obtained when the shot-peening was performed compared to the case in which the shot-peening processing was not performed. In particular, it can be seen that the hardness of the surface which was struck by the shot was remarkably high. In addition, the grain boundary oxidized layer formed by the carburizing and quenching processing was simultaneously removed by the shot-peening processing, and the fatigue strength of the entire connecting rod was improved.

As described above, the invention is characterized in carburizing and quenching material for a connecting rod for an internal combustion engine, grinding a carburized layer of the bearing portion to the portion which exhibits the maximum compressive residual stress, and performing a shot-peening processing on the ground surface. Therefore, the invention can yield a bearing portion having surface characteristics in which maximum compressive residual stress can be imparted, and therefore, remarkable improvement in the fatigue strength of the bearing portion can be obtained. Furthermore, a large number of concavities formed by the shot-peening processing can be efficiently employed as an oil reservoir, so that sliding properties and lubrication can be improved, and the occurrence of problems such as fretting corrosion, galling, and seize, can also be solved, and the galling and problems of seize can be prevented.

What is claimed is:

1. A production process for a connecting rod for an internal combustion engine, the process comprising the steps of:

(a) carburizing and quenching for forming a carburized layer at a surface layer of a material of the connecting rod for the internal combustion engine;

(b), after step (a), grinding the carburized layer formed in a bearing portion of the material until a depth at which compressive residual stress exhibits a maximum value, wherein the carburized layer remains at a depth of at least 0.15 mm after grinding; and (c), after step (b), shot-peening a surface ground by step (b).

2. A production process for a connecting rod for an internal combustion engine, according to claim 1, wherein the carburized layer is formed by carburizing over at least a depth of 500 $\mu$m from the surface of the material.

3. A production process for a connecting rod for an internal combustion engine, according to claim 1, wherein shot-peening Is performed at a pressure of 60 MPa or more.

4. A production process for a connecting rod for an internal combustion engine, according to claim 1, wherein shot-peening is performed at a pressure of 100 Mpa or more.

5. A production process for a connecting rod for an internal combustion engine, according to claim 1, wherein shot-peening is performed using spherical glass beads having a diameter of about 0.04 mm.

6. A production process for a connecting rod for an internal combustion engine, according to claim 1, wherein shot-peening is performed on a bearing portion of the material.

7. A production process for a connecting rod for an internal combustion engine, according to claim 1, wherein shot-peening is performed on the entire surface of the material so as to remove a grain boundary oxidized layer in the material.

8. A production process for a connecting rod for an internal combustion engine, according to claim 1, wherein the bearing surface has a surface roughness of approximately Rmax 2 $\mu$m or slightly less.

9. A production process for a connecting rod for an internal combustion engine, according to claim 8, wherein the shot-peening is performed using glass beads.

10. A production process for a connecting rod for an internal combustion engine, according to claim 9, wherein the glass beads have a spherical shape.

11. A production process for a connecting rod for an internal combustion engine, the production process comprising the steps of (a) carburizing and quenching the connecting rod for forming a carburized layer at a surface layer of a material of the connecting rod;

(b), after step (a), grinding the carburized layer formed in a bearing portion of the material to a depth in a range of 100 :m and 200 :m where the compressive residual stress exhibits a maximum value, wherein the carbur ized layer remains at a depth of at least 0.15 mm after grinding; and (c), after step (b), shot-peening the bearing portion.

12. A production process for a connecting rod for an internal combustion engine, according to claim 1, wherein the bearing surface has a surface roughness of Rmax 3 μm or less obtained by performing shot-peening at a pressure of 60 to 150 MPa.

13. A production process for a connecting rod for an internal combustion engine, according to claim 12, wherein the shot-peening Is performed using glass beads.

14. A production process for a connecting rod for an internal combustion engine, according to claim 13, wherein the glass beads have a spherical shape.

* * * * *